(12) United States Patent
Skrypchuk

(10) Patent No.: US 9,779,692 B2
(45) Date of Patent: *Oct. 3, 2017

(54) DISPLAY APPARATUS AND METHOD

(71) Applicant: Jaguar Land Rover Limited, Whitley, Coventry, Warwickshire (GB)

(72) Inventor: Lee Skrypchuk, Coventry (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/204,687

(22) Filed: Jul. 7, 2016

(65) Prior Publication Data

US 2017/0039998 A1 Feb. 9, 2017

Related U.S. Application Data

(63) Continuation of application No. 13/808,589, filed as application No. PCT/EP2011/061439 on Jul. 6, 2011, now Pat. No. 9,396,701.

(30) Foreign Application Priority Data

Jul. 6, 2010 (GB) .................... 1011372.8

(51) Int. Cl.
*G09G 3/36* (2006.01)
*G09G 5/10* (2006.01)
(Continued)

(52) U.S. Cl.
CPC ............. *G09G 5/10* (2013.01); *G02B 5/0231* (2013.01); *G02B 6/0033* (2013.01);
(Continued)

(58) Field of Classification Search
CPC ........................... G09G 3/3233; G09G 3/3406
(Continued)

(56) References Cited

U.S. PATENT DOCUMENTS 7,654,692 B2 2/2010 Kitamura et al.
7,824,091 B2 11/2010 Ijzerman et al.
(Continued)

FOREIGN PATENT DOCUMENTS

GB 2406731 A 4/2005
GB 2428345 A 1/2007
(Continued)

OTHER PUBLICATIONS

Search Report for application No. GB1011372.8, dated Oct. 20, 2011, 2 pages.
(Continued)

*Primary Examiner* — Calvin C Ma
(74) *Attorney, Agent, or Firm* — Reising Ethington P.C.

(57) ABSTRACT

A display apparatus suitable for use in any of a number of different display applications including, but not limited to, mounting to a dashboard of a motor vehicle. The display apparatus includes a display portion arranged to display an image having a brightness and a contrast, the brightness and/or contrast of the image being a function of viewing angle, the brightness and/or contrast having at least one local maximum along a direction substantially parallel to at least one primary vector, the at least one primary vector not being a vector substantially normal to a plane of the display portion.

20 Claims, 9 Drawing Sheets

(51) Int. Cl.
*F21V 8/00* (2006.01)
*G02B 27/14* (2006.01)
*G02F 1/1335* (2006.01)
*G02B 5/02* (2006.01)

(52) U.S. Cl.
CPC ......... *G02B 6/0051* (2013.01); *G02B 6/0055* (2013.01); *G02B 27/14* (2013.01); *G02F 1/133606* (2013.01); *G02F 2001/133607* (2013.01); *G09G 2320/066* (2013.01); *G09G 2320/0626* (2013.01); *G09G 2360/144* (2013.01)

(58) Field of Classification Search
USPC .............................. 345/77, 87, 102, 606, 620
See application file for complete search history.

(56) References Cited

U.S. PATENT DOCUMENTS

| | | |
|---|---|---|
| 8,154,686 B2 | 4/2012 | Mather et al. |
| 8,350,990 B2 | 1/2013 | Fuchikami et al. |
| 9,396,701 B2 * | 7/2016 | Skrypchuk ........... G02B 6/0033 |
| 2007/0013624 A1 | 1/2007 | Bourhill |
| 2007/0201242 A1 | 8/2007 | Shimura |
| 2007/0221943 A1 | 9/2007 | Moriya et al. |
| 2009/0058845 A1 | 3/2009 | Fukuda et al. |
| 2009/0103008 A1 | 4/2009 | Nasu et al. |
| 2011/0074803 A1 | 3/2011 | Kerofsky |

FOREIGN PATENT DOCUMENTS

| | | |
|---|---|---|
| GB | 2481812 A | 1/2012 |
| JP | H09146073 A | 6/1997 |
| JP | H11273438 A | 10/1999 |
| JP | 2004258596 A | 9/2004 |
| JP | 2005266293 A | 9/2005 |
| JP | 2005343332 A | 12/2005 |
| JP | 2008021420 A | 1/2008 |
| JP | 2008096765 A | 4/2008 |
| JP | 2009521084 A | 5/2009 |
| JP | 2009276461 A | 11/2009 |
| JP | 2013539057 A | 10/2013 |
| WO | WO2005071474 A2 | 8/2005 |
| WO | WO2007004377 A1 | 1/2007 |
| WO | WO2007072263 A3 | 6/2007 |
| WO | WO2012004318 A2 | 1/2012 |

OTHER PUBLICATIONS

International Search Report for International application No. PCT/EP2011/061439, dated May 25, 2012, 5 pages.
Combined Search and Examination Report for application No. GB131056.0, dated Aug. 7, 2013, 4 pages.
Japanese Office Action in Japanese with English summary for JP application No. 2013-517379, dated Mar. 11, 2014, 6 pages.

* cited by examiner

DISPLAY APPARATUS AND METHOD

FIELD OF THE INVENTION

The present invention relates to display apparatus for displaying information and to a method of providing a display of information to a user. In particular but not exclusively the invention relates to display apparatus for use in providing a display of information to an operator of transportation means, such as a driver of a vehicle or a pilot of an aircraft or watercraft.

BACKGROUND

It is known to provide a centre console display device in a dashboard of a motor vehicle having side-by-side seating directly in front of the dashboard. The display device is visible to the driver and front seat passenger and may contain information such as navigation information, audio information, climate information and communication information.

A major failure mode of such a display device is known as sunlight washout. Sunlight washout refers to a reduction in display performance to and beyond the point of failure due to high ambient light levels. That is, under certain lighting conditions such as when direct sunlight is incident on the display, the information on the display cannot be read by a person viewing the display. The failure is due primarily to the optical properties and performance of the display itself, such as a brightness of illumination emitted by the display and a reflectance of the display to light incident thereon.

FIG. 1 is a schematic diagram showing a known LCD display device 1 mounted to the dashboard of a motor vehicle. The positions of eyes of a driver D and of a passenger P of the vehicle are shown. It can be seen that the eyes of the driver D view the display device 1 in a direction that is at an angle $\theta_1$ to a direction N normal to the display, the direction lying in a plane substantially normal to the plane of the device 1.

The eyes of the passenger P view the display device 1 along a direction that is at an angle $\theta_2$ to the direction N. $\theta_1$ and $\theta_2$ are typically in the range 30-35 degrees in a motor vehicle.

FIG. 2 is a plot of luminance of the LCD display 1 as a function of viewing angle. A central area of the plot labeled ML includes the direction N (FIG. 1) and shows the range of viewing angles over which the display 1 generates the maximum luminance values.

A circumferential edge of the plot corresponds to a direction substantially in the plane of the display 1 and the shading indicates that the display 1 generates the lowest values of luminance when viewed along a direction in this plane.

The range of viewing angles with which a passenger P and driver D typically view the display are superimposed on the plot in dotted lines and labeled P, D respectively. It can be seen that this range of viewing angles does not include the range of viewing angles ML at which maximum luminance from the display 1 is enjoyed. It is to be understood that this is because the driver D and passenger P do not view the display along a direction normal to the plane of the display 1.

SUMMARY OF THE INVENTION

According to one aspect of the invention there is provided display apparatus comprising a display portion arranged to display an image having a brightness and a contrast, the brightness and/or contrast of the image being a function of viewing angle, the brightness and/or contrast having at least one local maximum along a direction substantially parallel to at least one primary vector of the apparatus.

In an embodiment, the at least one primary vector is not a vector normal to a plane of the display portion. In an embodiment, the at least one primary vector is inclined to a plane of the display portion by an angle of less than 90°. For example, the at least one primary vector may be inclined to a plane of the display portion, or to a plane normal to a plane of the display portion, by an angle lying between approximately 20° and 40°.

Embodiments of the invention have the advantage that an increased intensity of light may be presented to a driver of a vehicle viewing the display along a primary vector of the apparatus. Thus, embodiments of the invention are advantageous in environments such as the cockpit of a vehicle having a centre-mounted display apparatus where the driver and passenger are sat in respective locations displaced laterally of the centerline of the vehicle and on opposite sides of the centerline. The display may be mounted in an 'east-west' manner, i.e. with a normal to the display parallel to the longitudinal axis of the vehicle such that one intensity maximum of the display is directed towards eyes of the driver and another intensity maximum is directed towards eyes of the passenger.

The display devices typically employed in motor vehicles are liquid crystal display (LCD) devices. A disadvantage of LCD display devices is that the brightness and contrast of the image provided by the display is a function of an angle between a direction along which the device is viewed and a normal to a plane of the display of the device. Maximum brightness and contrast is enjoyed when the display is viewed along a direction parallel to the normal to the plane of the display.

As the angle between the normal to the display and the direction along which the display is viewed increases, a brightness of the displayed image (which is also dependent on the intensity of illumination developed by a backlight of the device) and the contrast of the display (dependent at least in part on characteristics of a liquid crystal (LC) panel of the device) reduce significantly.

In some cases a brightness and a contrast of a display may be 50% lower at the viewing angle at which a driver or passenger typically views a centre console display of a vehicle compared with that when the display is viewed along a direction normal to the display. It is therefore apparent that a considerable waste of energy occurs since the light scattered out of the angle of view of the driver and passenger serves no useful purpose.

Conveniently the brightness and/or contrast of the display may have a plurality of local maxima, each maximum corresponding to a respective different primary vector.

This has the advantage that the display may be made selectively visible from more than two directions, for example a direction corresponding to the position of the driver of the vehicle and one or more other occupants of the vehicle. Thus, the same display of information can be seen from a plurality of different viewing directions.

In an embodiment the apparatus comprises at least one illumination means, the apparatus being arranged preferentially to project light from the at least one illumination means in a direction parallel to the at least one primary vector thereby to display the image.

By preferentially is meant that the illumination has a local maximum in intensity in a direction parallel to the at least one primary vector.

The apparatus may further comprise at least one scattering means, the at least one illumination means being arranged to direct light towards the at least one scattering means, the at least one scattering means being arranged in turn to scatter light in said direction parallel to the at least one primary vector thereby to display the image.

The presence of at least one scattering means has the advantage that a single illumination source such as a point source of illumination may be arranged to illuminate a larger area in a substantially uniform manner in a relatively compact package.

In an embodiment the apparatus comprises a plurality of illumination means, each of said plurality of illumination means being arranged to project light along a direction parallel to a respective different primary vector.

This has the advantage that the apparatus may be configured selectively to project illumination along a given one of the plurality of primary vectors as required. Thus, one illumination means may be arranged (for example in combination with at least one scattering means) to project light parallel to one primary vector, whilst another illumination means may be arranged (possibly in combination with the same or at least one other scattering means) to project light parallel to another primary vector.

The plurality of illumination means may be arranged in an array being one selected from amongst a one dimensional array, a two dimensional array and a three dimensional array.

Thus, in some embodiments of the invention the illumination means may be arranged in a single row. The row may be a substantially straight line corresponding to a one-dimensional array. Alternatively the illumination means may be arranged in the form of a plurality of rows. The plurality of rows may be arranged in a substantially coplanar manner corresponding to a two-dimensional array. Other arrangements are also useful.

The at least one illumination means may comprise at least one illumination element.

The at least one illumination means may comprise a plurality of illumination elements.

The at least one illumination element may comprise at least one selected from amongst a solid state light source and a gas-phase excitation light source.

The apparatus may comprise a plurality of scattering means, each of the plurality of scattering means being arranged (in combination with a corresponding illumination means) to scatter light along a direction parallel to a different respective primary vector.

The plurality of scattering means may be arranged in an array being one selected from amongst a one dimensional array, a two dimensional array and a three dimensional array.

Thus, in some embodiments of the invention the scattering means may be arranged in a single row. The row may be a substantially straight line corresponding to a one-dimensional array. Alternatively the scattering means may be arranged in the form of a plurality of rows. The plurality of rows may be arranged in a substantially coplanar manner corresponding to a two-dimensional array. Other arrangements are also useful.

Each of the plurality of scattering means may comprise at least one scattering element.

The at least one scattering element may comprise at least one selected from amongst a diffuse scattering element and a specular reflection scattering element.

By specular reflection scattering element is meant an element arranged such that for a ray of light incident thereon an angle of reflection of the ray from the element is substantially equal to an angle of incidence of the ray upon the element.

The apparatus may be operable selectively to energize one or more of the plurality of illumination means independently of one another.

The apparatus may be operable selectively to energize one or more of the plurality of illumination means in dependence upon a determination whether or not a user requires to view the display along a direction parallel to one of the plurality of primary vectors.

This has the advantage that a power consumption of the display may be reduced when it is determined that it is not required to view the display along a given one or more of the plurality of primary vectors. This is particularly advantageous in motor vehicles since in some cases single-occupant journeys may account for a substantial proportion of journeys made by a vehicle.

Furthermore, the apparatus may be arranged to detect an ambient light level and to adjust an intensity of illumination of the display responsive to the ambient light level.

Still furthermore, the apparatus may be arranged to determine when a visibility of the display to one of a plurality of viewers is degraded due to ambient light wash out and to increase an intensity of illumination parallel to the corresponding primary vector thereby to reduce a risk of failure of the display for a given viewer.

Thus, the apparatus may comprise or be coupled to a sensor arranged to sense a direction from which ambient light is incident on the display.

The display portion may comprise a panel arranged selectively to transmit light from the means for illumination therethrough thereby to introduce contrast into the image.

The panel may be arranged selectively to transmit light therethrough along a direction parallel to the at least one primary vector.

This has the advantage that a backlight is not required preferentially to project light along a direction parallel to the at least one primary vector in order for light to be projected from the apparatus preferentially parallel to this vector.

The panel may be arranged selectively to transmit light therethrough along a direction parallel to a plurality of primary vectors.

In an embodiment the panel is operable to transmit light therethrough along a direction parallel to a selected one or more of a plurality of respective different primary vectors.

The panel may be a liquid crystal display panel.

According to another aspect of the invention there is provided a motor vehicle having apparatus according to the first aspect provided therein.

The apparatus may be mounted to a dashboard of the vehicle, the display being visible to a driver and a passenger of the vehicle.

Advantageously the apparatus may have a first primary vector arranged to be directed from the display to eyes of the driver and a second primary vector arranged to be directed from the display to eyes of the passenger in their normal seated positions.

The apparatus may be arranged to direct illumination along the second primary vector only when the passenger is seated in the vehicle.

Alternatively or in addition the apparatus may be arranged to direct illumination along the first primary vector only when the driver is seated in the vehicle.

This has the advantage that when a driver or passenger is not present in the vehicle the display may be arranged not to project light towards the position they would otherwise occupy thereby reducing an amount of power consumed by the apparatus. This feature is particularly useful in applications where a reduction in power consumption of vehicle accessories is important, such as in electric or hybrid electric vehicle applications.

According to a further aspect of the invention there is provided a method of displaying an image comprising: providing display apparatus comprising a display portion arranged to display an image having a brightness and a contrast, the brightness and/or contrast of the image being a function of viewing angle, the brightness and/or contrast having at least one local maximum along a direction substantially parallel to at least one primary vector of the apparatus, the at least one primary vector not being a vector substantially normal to a plane of the display portion.

Within the scope of this application, it is envisaged that the various aspects, embodiments, examples, features and alternatives set out in the preceding paragraphs, in the claims and/or in the following description and drawings, may be taken independently or in any combination thereof. For example, features disclosed in connection with one embodiment are applicable to all embodiments unless there is an incompatibility of features.

BRIEF DESCRIPTION OF THE DRAWINGS

The present invention will now be described, by way of example only, with reference to the accompanying figures in which.

DETAILED DESCRIPTION

Embodiments of the present invention are directed to providing a display device suitable for centre-mounting to the dashboard of a vehicle and which is of improved visibility to a driver and/or passenger of the vehicle.

The present inventor has recognized that the viewing arrangement and viewing conditions of an LCD display device centre-mounted in a motor vehicle dashboard is very different from that for which LCD device manufacturers design their devices.

Figure 1:
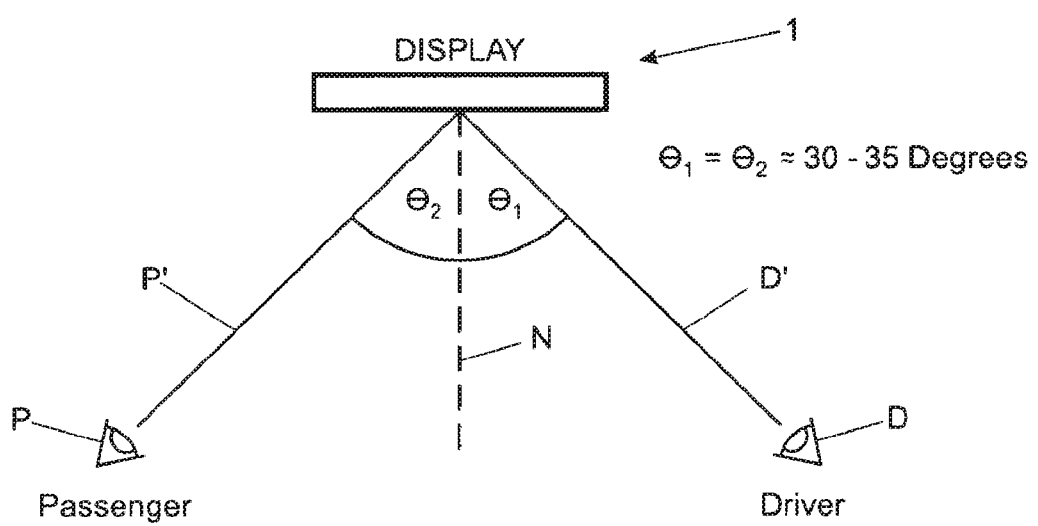
FIG. 1 is a schematic diagram showing a known LCD display device 1 mounted to the dashboard of a motor vehicle and the directions along which the device is typically viewed.
Figure 2:
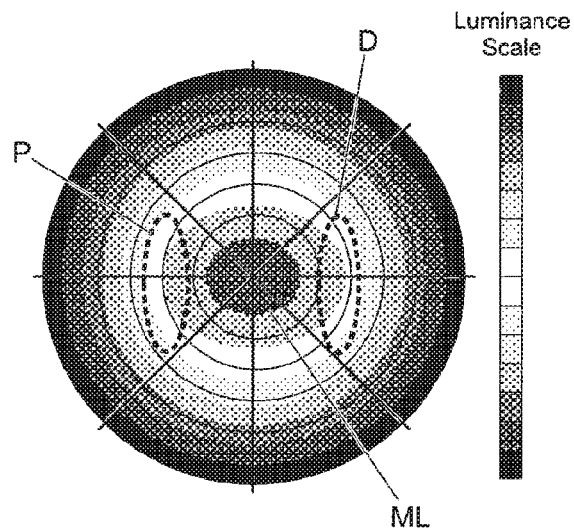
FIG. 2 is a plot of luminance as a function of viewing angle for a known LCD display.

This is because the manufacturers design their devices to be viewable over the widest range of viewing angles possible, i.e. for a range of angles as close to 180° as possible. In the context of a motor vehicle the present inventor has recognized that the required viewing range of a display mounted centrally of a vehicle dashboard is relatively limited. This is because, as illustrated in FIG. 1, the locations of the driver and passenger of the motor vehicle are typically substantially fixed relative to the location of the display.

Figure 3:
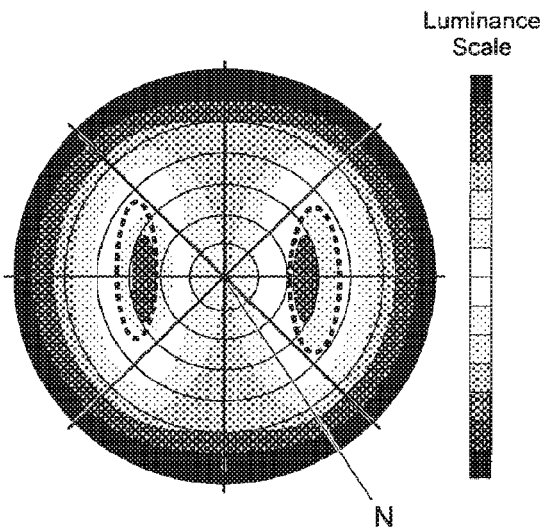
FIG. 3 is a plot of luminance as a function of viewing angle for an LCD display according to an embodiment of the invention.

FIG. 3 is a plot of luminance as a function of viewing angle for an LCD display device according to an embodiment of the invention. The device is configured such that there are two local maxima in luminance as a function of viewing angle. The maxima are arranged to correspond to the range of viewing angles typical of the driver and passenger of a vehicle having a centre-mounted display. In the embodiment shown neither of the maxima occur along a direction parallel to a normal N to the display.

Embodiments of the invention have the advantage that a risk of failure of the display under intense ambient lighting conditions is reduced for a given value of luminance maximum that the device is able to generate.

This is because in the case of a prior art display 1 having a luminance maximum along a direction N normal to the display, neither the driver nor the passenger are able to view the display along the direction of maximum luminance from their normal seated positions.

Only in a display according to an embodiment of the present invention can the driver and passenger benefit from the maximum luminance available from the device. This is because the device is adapted to provide the maximum luminance along a direction from the display to an eye of the driver and/or passenger in their normal seated positions either side of a centerline of the vehicle.

In some embodiments the display is arranged such that the directions of greatest luminance correspond to a range of directions from which the eyes of the driver and passenger, respectively, are expected to view the display for a prescribed proportion of the time for which they view the display.

For example, the range of directions may correspond to a range of directions along which the driver and passenger are expected to view the display for 95% of the time for which they are seated under normal driving conditions.

It is to be understood that some embodiments of the invention have the advantage that since the intensity of illumination directed towards the driver and passenger is increased relative to prior art displays, the display may be operated at a reduced power level relative to prior art displays and still provide the same intensity of illumination along directions from the display to the driver and passenger. Accordingly, embodiments of the invention are advantageous in applications where reducing electrical power consumption is important as discussed above.

It is to be understood that a display device according to an embodiment of the present invention may be arranged to have any number of local intensity maxima including only one intensity maximum, two intensity maxima or more than two intensity maxima. In the case of a device having a plurality of intensity maxima, one of the intensity maxima may be arranged to be generated along a direction parallel to a normal N to a plane of the display of the device.

Figure 4:
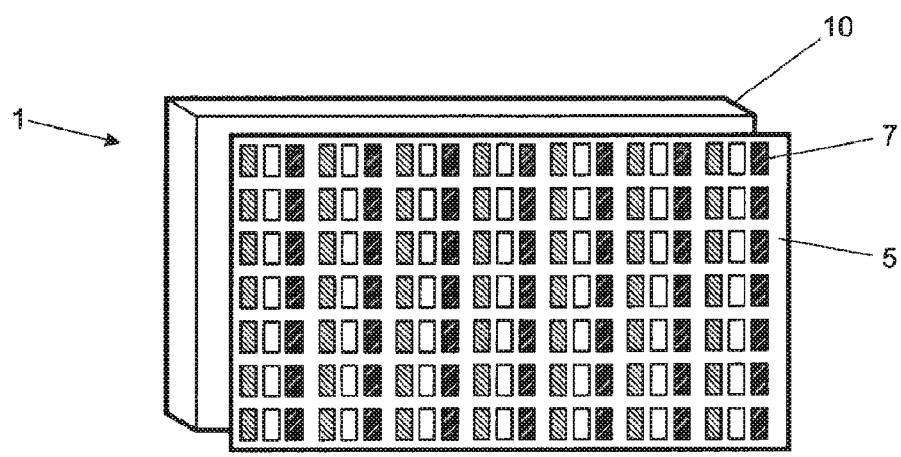
FIG. 4 is a schematic illustration of a known LCD display device.

FIG. 4 is a schematic illustration of a known LCD device 1. The device has a conventional liquid crystal (LC) panel 5 arranged to modulate an intensity of light passing through respective pixels 7 of the LC panel 5 from a backlight panel 10. The backlight panel 10 is arranged to project light (typically white light) through the LC panel 5 in a forward direction, i.e. in a direction normal to a plane of the backlight panel 10 and LC panel 5.

In a typical LCD device 1, a brightness profile of the device (i.e. a brightness of the device as a function of viewing angle) is largely dependent on one or more characteristics of the backlight panel 10 whilst the contrast profile of the image (i.e. a contrast of the device as a function of viewing angle) is largely dependent on one or more characteristics of the LC panel 5.

Figure 5A:
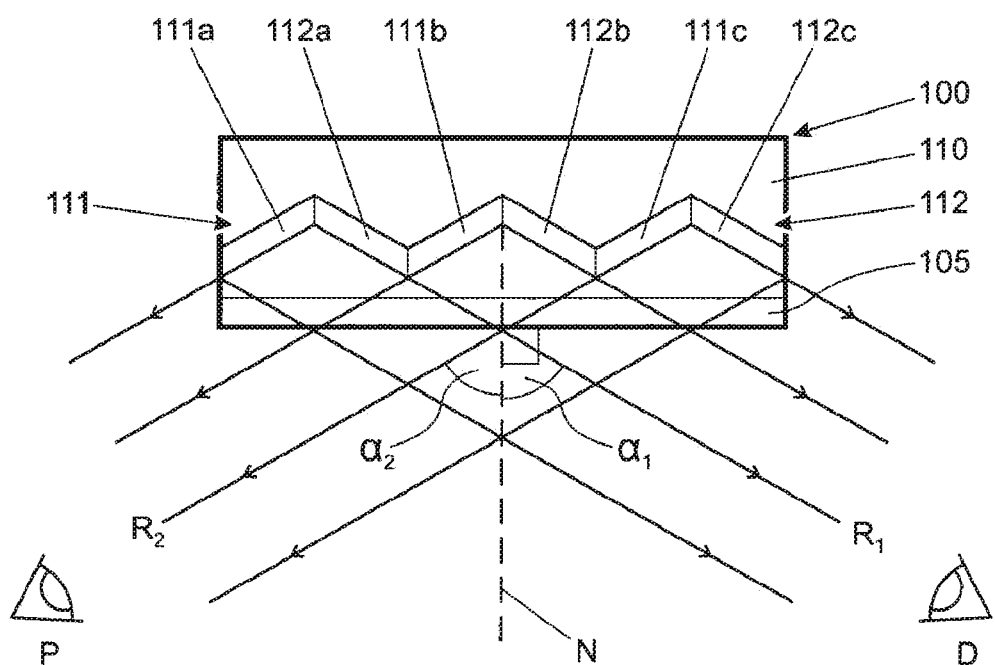
FIG. 5A is a schematic illustration of a cross-section of an LCD display device according to an embodiment of the invention as viewed along a direction normal to a plane of an LC panel of the device.

FIG. 5A shows an LCD device 100 according to an embodiment of the invention. The device 100 has an LC panel 105 similar to that of the prior art panel of FIG. 4. The device 100 also has a backlight panel 110.

The backlight panel 110 is provided with first and second arrays 111, 112 of illumination sources. The first array 111 has three illumination sources 111a, 111b, 111c arranged to project illumination (which may also be referred to as illuminating light or illuminating radiation) through the LC panel 105 preferentially in a first direction $R_1$ towards an eye of a first viewer D.

The second array 112 also has three illumination sources 112a, 112b, 112c and is arranged to project light through the LC panel 105 preferentially in a second direction $R_2$ towards an eye of a second viewer P. In the embodiment of FIG. 5A, $R_1$ and $R_2$ are arranged symmetrically about a plane normal to the LC panel 105 parallel to an edge thereof. It is to be understood that in normal use, the device 100 is mounted with this plane substantially parallel to a vertical axis of a vehicle in which the device 100 is installed. This plane may also be coincident with a longitudinal axis of the vehicle.

In the embodiment shown, $R_1$ lies at an angle $\alpha_1$ to a normal N to the plane of the LC panel 105 and $R_2$ lies at an angle $\alpha_2$ to the normal N where $\alpha_1$ and $\alpha_2$ are coplanar and non-parallel. In the embodiment shown, $\alpha_1$ and $\alpha_2$ are both substantially equal to 30°. Other values of $\alpha_1$ and $\alpha_2$ are also useful. For example, values in the range from around 20° to around 40°, optionally from around 25° to around 35° are also useful.

The LC panel 105 of the embodiment of FIG. 5A is rectangular in shape when viewed along the normal N although other shapes are also useful.

Figure 5B:
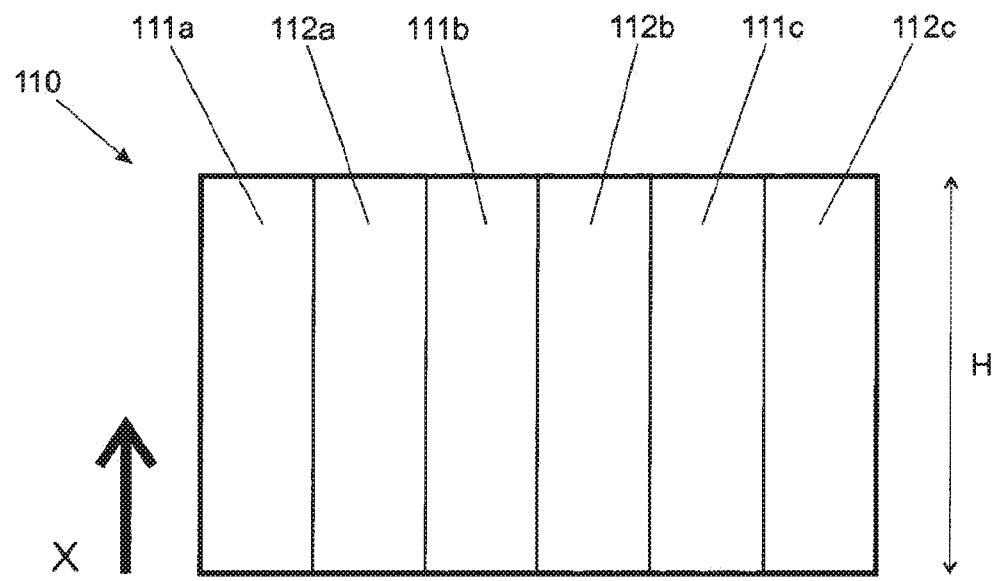
FIGS. 5B-5C are front elevations of a backlight panel of two alternative embodiments of the invention.

In the embodiment shown in FIG. 5B, the illumination sources 111a, 111b, 111c, 112a, 112b, 112c of the backlight panel 110 are columnar sources. Each of the sources is arranged to project a column of illumination through the LC panel 105 such that the illumination spans a height H of the panel. FIG. 5B shows the arrangement of the backlight panel 110 of the display 100 as viewed along a normal N to the panel 110. It can be seen that the illumination sources 111a, 111b, 111c, 112a, 112b, 112c of the backlight panel 110 are arranged in a side by side configuration.

The illumination sources 111a, 111b, 111c of the first array 111 are oriented such that a direction of maximum intensity of light from the sources is directed substantially parallel to the first direction $R_1$. Similarly, the illumination sources 112a, 112b, 112c of the second array 112 are oriented such that a direction of maximum intensity of light from the sources is directed substantially parallel to the second direction $R_2$.

It is to be understood that the backlight panel 110 may be arranged to vary a direction $R_1$, $R_2$ along which a maximum intensity of illumination is projected from the panel 110 as a function of position along a length of an illumination source (i.e., along the x axis of FIG. 5B). This allows an LCD device 100 to be provided having a luminance characteristic as a function of angle substantially as shown in the plot of FIG. 3.

Other luminance characteristics as a function of angle are also useful.

In an alternative embodiment, a two dimensional array of illumination sources is provided. That is, the illumination sources are arranged in rows and columns as illustrated in FIG. 5C.

Figure 5C:
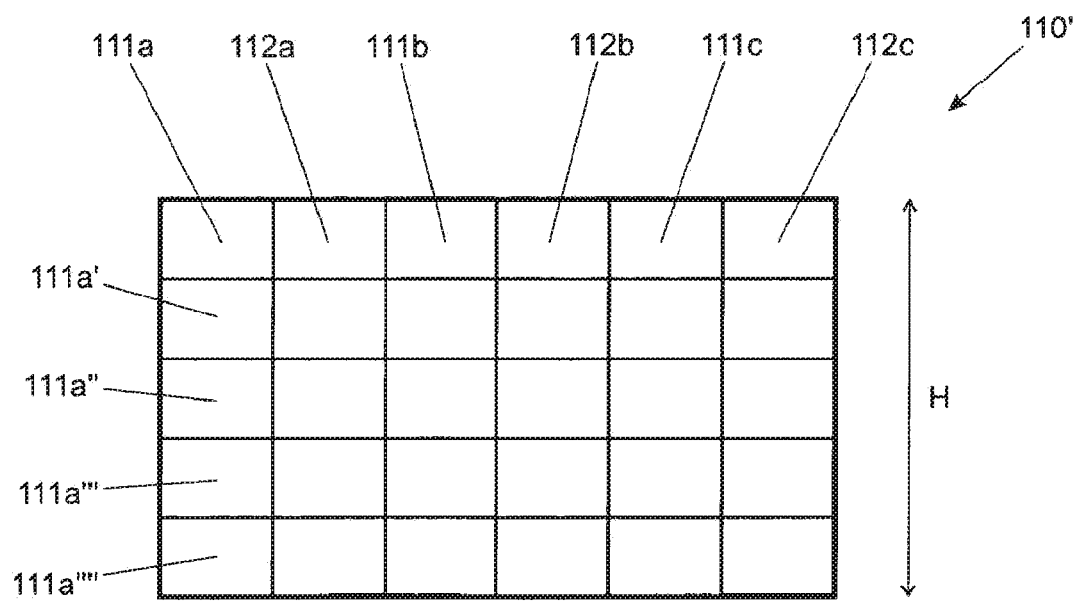

FIG. 5C shows a backlight panel 110' having five rows and six columns of illumination sources.

Illumination sources forming a first row of the array are labeled 111a, 111b, 111c, 112a, 112b, 112c in FIG. 5C whilst illumination sources forming a first column of the array are labeled 111a, 111a', 111a", 111a''' and 111a''''.

It is to be understood that an orientation of each illumination source of the panel 110' may be arranged such that the luminance characteristic of the display 100 as a function of viewing angle corresponds substantially to a required characteristic, such as that of FIG. 3.

It is to be understood that one or more focusing elements and/or optical diffusers may be incorporated into LCD devices according to embodiments of the invention. For example, each illumination source may be provided with a focusing element and/or an optical diffuser. Alternatively a single focusing element and/or optical diffuser may be provided for each of a plurality of illumination sources. In a still further alternative a single focusing element and/or optical diffuser may be provided to focus and/or diffuse light from all illumination sources. Other arrangements are also useful.

In the embodiment shown the sources are solid state light sources in the form of light emitting diodes. Other illumination sources are also useful including gas-phase excitation light sources such as plasma light sources or fluorescent lamp sources.

Figure 6A:
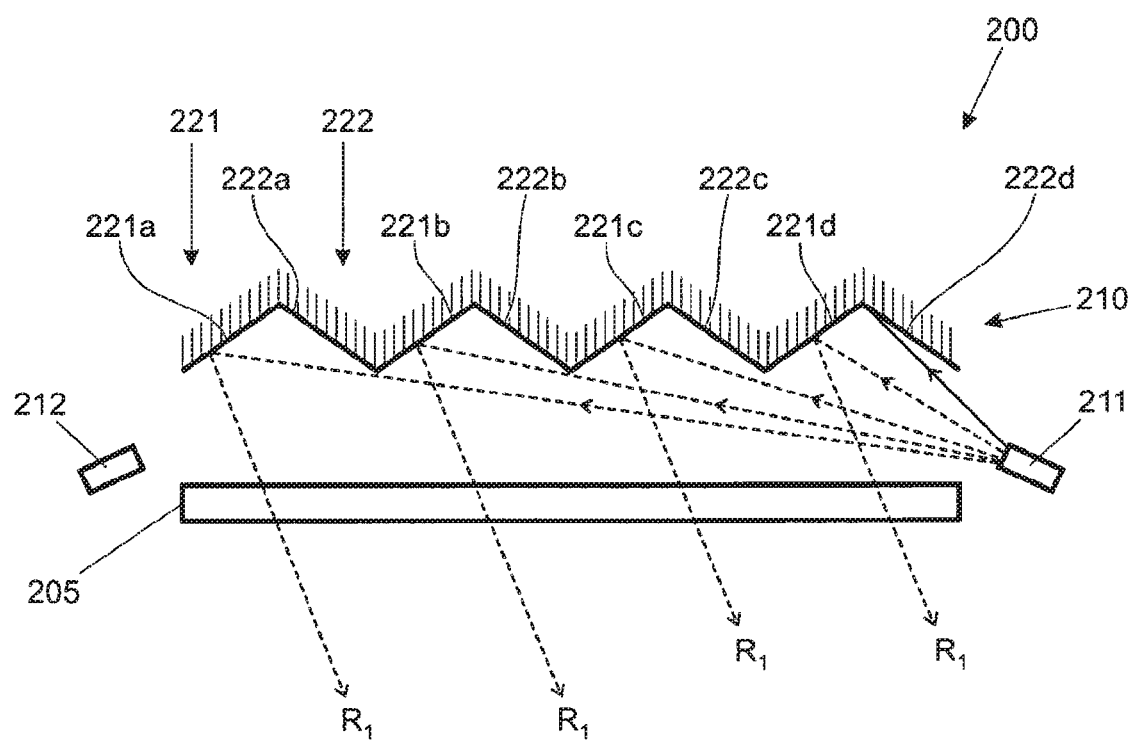
FIGS. 6A-6B are schematic illustrations of an LCD display device according to a further embodiment of the invention.
Figure 6B:
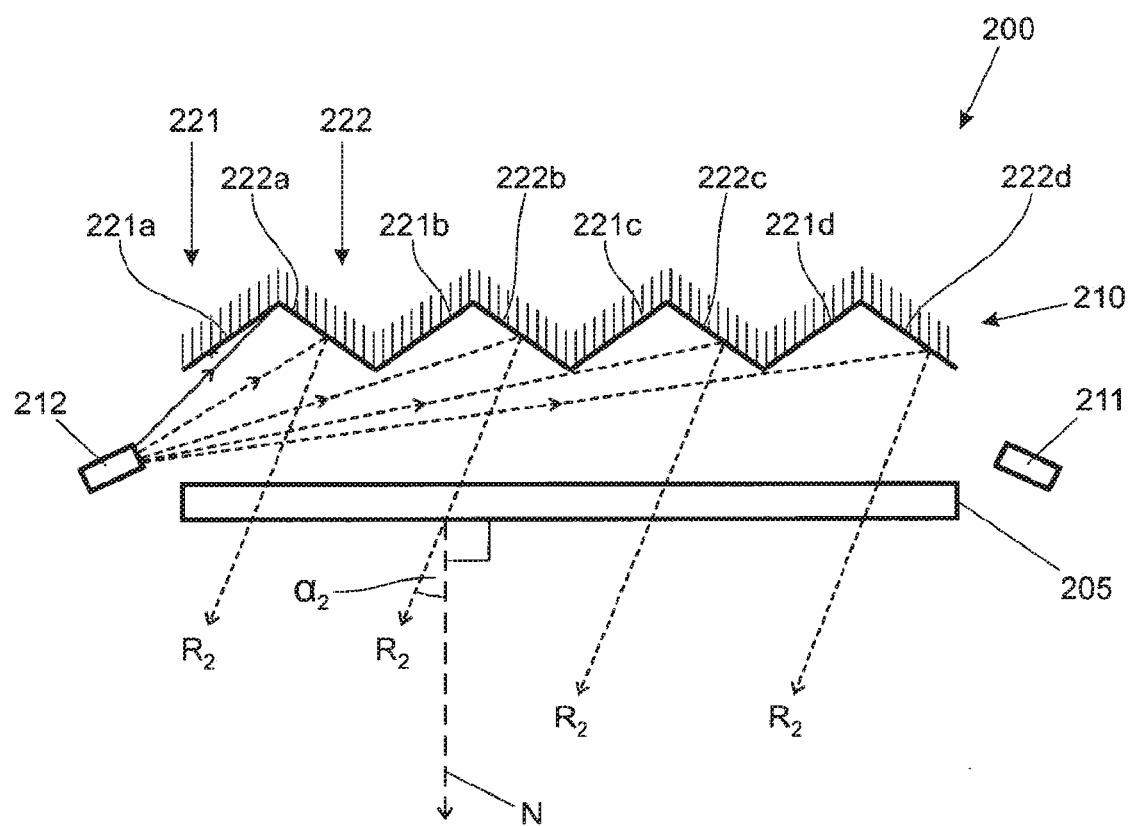

FIGS. 6A-6B show an LCD device 200 according to an alternative embodiment of the invention also having an LC panel 205 and a backlight panel 210. In the embodiment shown a single illumination source 211, 212 is provided for each direction $R_1$, $R_2$ along which it is required preferentially to project light.

The apparatus 200 has a first array 221 of scattering elements 221a, 221b, 221c, 221d and a second array 222 of scattering elements 222a, 222b, 222c, 222d. The first and second arrays 221, 222 are arranged in a plane substantially parallel to the LC panel 205.

The first array 221 of scattering elements 221a, 221b, 221c, 221d is arranged to project light from the first light source 211 through the LC panel 205 preferentially parallel to direction $R_1$ as shown in FIG. 6A. The second array 222 of scattering elements 222a, 222b, 222c, 222d is arranged to project light from the second light source 212 through the LC panel 205 preferentially parallel to direction $R_2$ as shown in FIG. 6B.

In some embodiments the scattering elements 221a, 221b, 221c, 221d and 222a, 222b, 222c, 222d are arranged diffusely to scatter light. In some alternative embodiments the scattering elements are specular reflector elements such as mirror elements. By specular reflector elements is meant reflector elements for which an angle of scattering of light incident thereon is substantially equal to an angle of incidence of the light upon the reflector element.

Other arrangements are also useful.

In some embodiments of the invention, illumination directed towards the eyes of the passenger P and/or driver D may be turned off thereby enabling a reduction in power consumption when viewing of the display is not required by the passenger and/or driver respectively.

For example, the illumination directed towards the eye of the passenger P in direction $R_2$ may be turned off when it is detected that a passenger is not sat in the passenger seat. Determining whether or not a passenger is sat in the passenger seat may be accomplished by conventional means, for example by measuring a weight borne by the passenger seat.

Similarly, in some embodiments the illumination directed towards the eye of the driver D in direction $R_1$ may be turned off when it is detected that a driver is not sat in the driver seat.

It is to be understood that in some embodiments the LC panel 205 itself is arranged preferentially to transmit light in one or both of directions $R_1$ and $R_2$. In some embodiments this is accomplished by optimizing a configuration of LC molecules of the LC panel. For example, a known alignment method such as in-plane switching (IPS), multi-domain vertical alignment (MVA) or twisted nematic (TN) may be arranged to provide preferential transmission of light through the panel 205 over the range(s) of angles corresponding to the position(s) of one or more viewers of the apparatus as described above.

In some embodiments an optical film is provided, the film being arranged to direct light incident upon the film in a direction towards the eyes of the driver D and/or passenger P. The film may be a holographic optical element (HOE).

Figure 7:
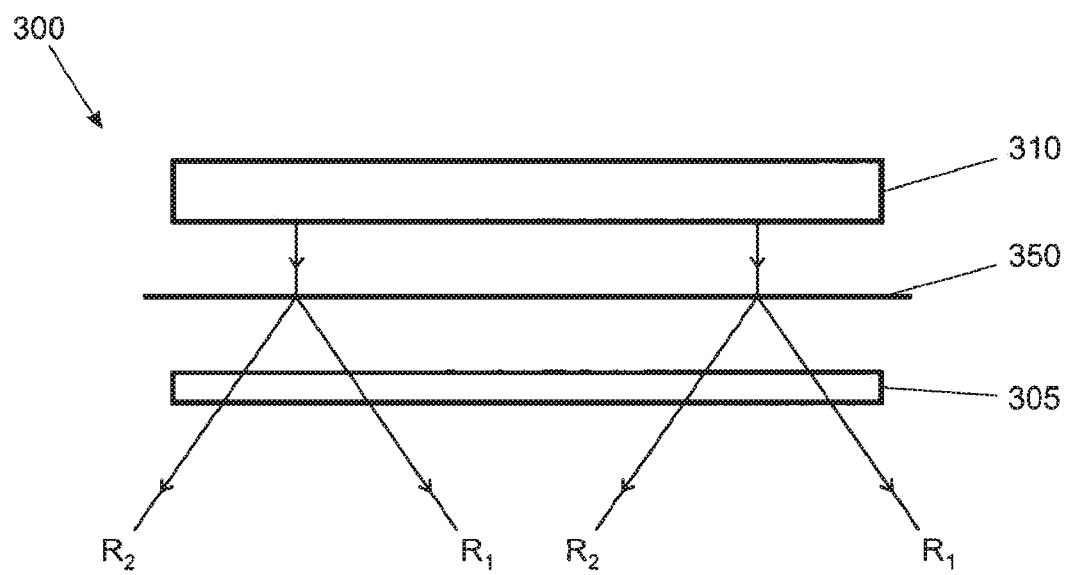
FIG. 7 is a schematic illustration of an LCD display device incorporating a holographic optical element.

FIG. 7 shows apparatus 300 according to an embodiment of the invention in which a backlight panel 310 is arranged to illuminate a HOE 350 which is in turn arranged to illuminate an LC panel 305. The HOE 350 is arranged to scatter light in each of two directions $R_1$, $R_2$. As described above $R_1$ is arranged to correspond to a vector (or direction) from the apparatus 300 to the eyes of a driver D whilst $R_2$ is arranged to correspond to a vector (or direction) from the apparatus 300 to the eyes of a passenger P.

Figure 8A:
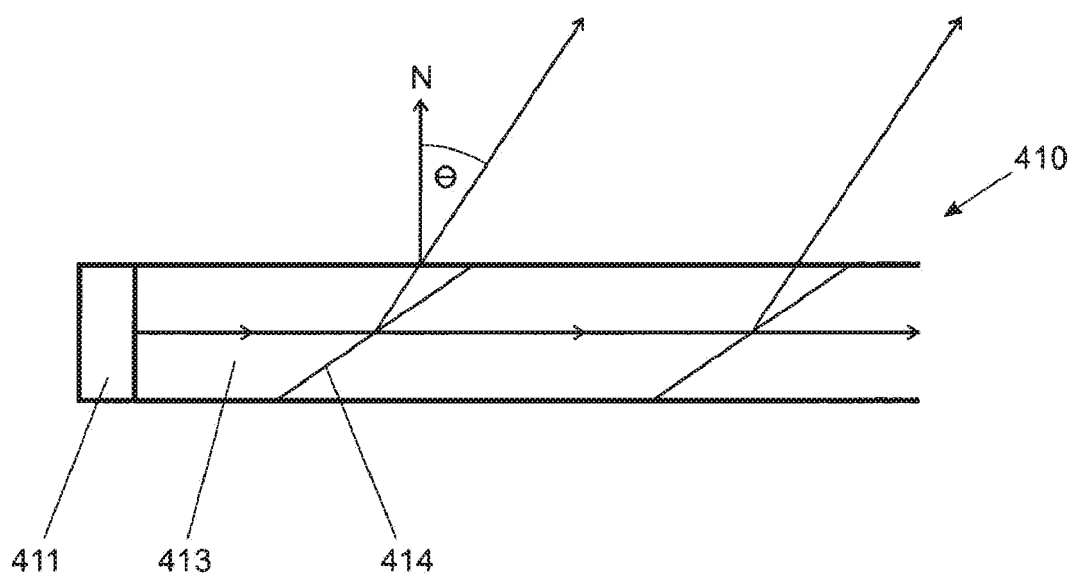
FIGS. 8A-8B are schematic illustrations of backlight structures suitable for use in some embodiments of the invention.

FIG. 8A shows a backlight panel 410 of apparatus according to an embodiment of the invention in which a waveguide 413 is arranged to project light preferentially therefrom along a primary vector of the apparatus.

The waveguide 413 has an illumination source 411 at an end thereof arranged to project light along the waveguide 413. In the embodiment shown, partially reflecting mirror elements 414 are provided at spaced intervals along the waveguide to reflect light through an angle (90−θ)°. Thus, the light emerges from the waveguide at an angle θ with respect to a direction N normal to the waveguide. It is to be understood that a portion of a beam of light propagating along the waveguide will be reflected by successive partially reflecting mirror elements 414.

Other arrangements of reflecting or scattering element(s) are also useful. For example in some embodiments the scattering element(s) may be formed by laser irradiation of a surface or other surface modification technique. The waveguide 413 is arranged such that light emerging from the display apparatus in which it is incorporated has a local intensity maximum parallel to a primary vector of the apparatus.

Figure 8B:
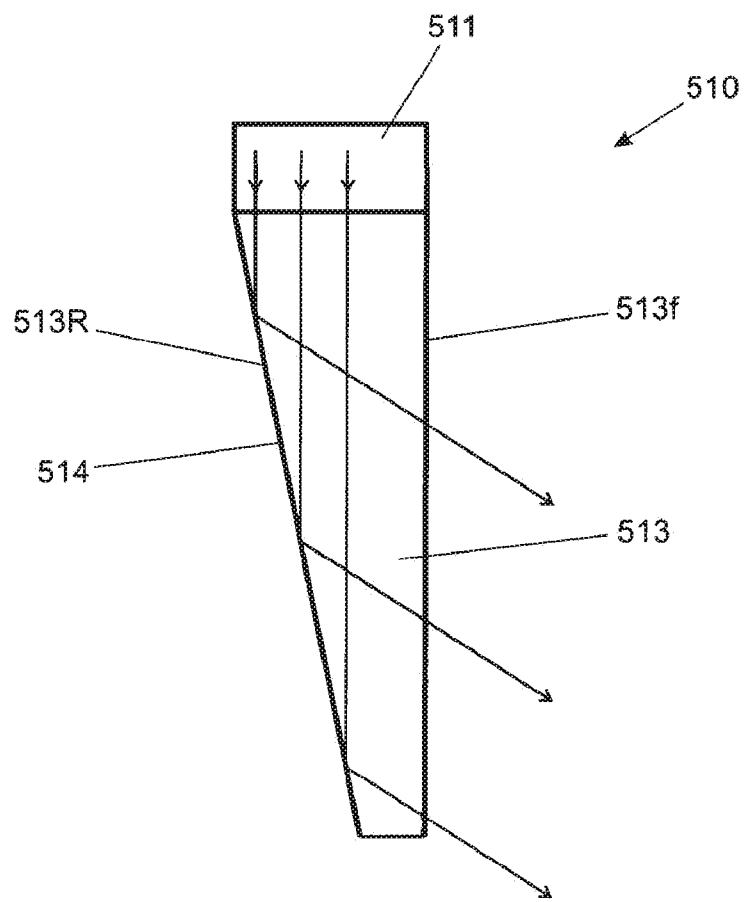

FIG. 8B shows a further embodiment of a backlight 510 suitable for display apparatus according to embodiments of the invention. The backlight 510 has a light source 511 arranged to couple a beam of light to a waveguide 513 having a tapering or wedge-like shape. A front surface 513F of the waveguide 513 is arranged to be placed parallel to an LC (or other) contrast-inducing panel. A rear surface 513R of the waveguide 513 provides a scattering element 514 and is arranged to scatter light from the light source 511 through the front surface 513F of the waveguide 513 such that light is preferentially directed from the display apparatus parallel to a primary vector of the apparatus.

It is to be understood that the apparatus 100, 200, 300 of FIGS. 5 to 7 or apparatus including a waveguide of a type shown in FIG. 8A-8B may be arranged to exhibit a luminance profile as a function of viewing angle corresponding substantially to the plot of FIG. 3. Other arrangements are also useful. For example, the luminance profile may have only one intensity maximum. Alternatively the luminance profile may have more than two intensity maxima.

In some embodiments the display apparatus is provided with or is in communication with one or more light sensors. The apparatus is arranged to vary an intensity of illumination projected along one or more of the primary vectors of the apparatus in dependence on a direction from which external illumination (such as sunlight) is incident on the display.

Thus, when direct sunlight is incident on the display from a direction such that the driver or passenger's ability to read information presented by the display is reduced, the apparatus is arranged to increase an intensity of illumination of the display along the primary vector corresponding to the location of the driver or passenger.

Similarly, if the direction of external illumination is such that the driver or passenger's ability to read information presented by the display is increased, for example due to entering a shadowed region or a change in direction of travel of the vehicle, an intensity of illumination projected along the corresponding primary vector may be reduced.

It is to be understood that this feature has the advantage of reducing a power consumption of the apparatus. In some embodiments this feature also has the advantage of increasing an enjoyment of the display apparatus by the user since readability of the information presented by the display is improved over a range of conditions of ambient lighting.

The light sensors may be comprised in the apparatus, or mounted separately from the apparatus, for example on a dashboard of the vehicle, on an external surface of the vehicle or any other suitable location.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A display apparatus comprising a display portion arranged to display an image having a brightness and a contrast, the brightness and/or contrast of the image being a function of viewing angle, the brightness and/or contrast having at least one local maximum along a direction substantially parallel to at least one primary vector of the apparatus, wherein the apparatus comprises a plurality of illumination sources, each of said plurality of illumination sources being arranged to project light along a direction parallel to a respective different one of a plurality of primary vectors to display the image, the display apparatus being operable selectively to energize one or more of the plurality of illumination sources in dependence upon a determination whether or not a user requires to view the display along a direction parallel to one of the plurality of primary vectors.

2. Apparatus as claimed in claim 1 further comprising at least one scattering member, at least one of the plurality of illumination sources being arranged to direct light towards the at least one scattering member, the at least one scattering member being arranged in turn to scatter light in said direction parallel to one of the plurality of primary vectors thereby to display the image.

3. Apparatus as claimed in claim 2 comprising a plurality of scattering members, each of the plurality of scattering members being arranged to scatter light along a direction parallel to a different respective primary vector.

4. Apparatus as claimed in claim 3 wherein the plurality of scattering members are arranged in an array being one selected from amongst a one dimensional array, a two dimensional array and a three dimensional array.

5. Apparatus as claimed in claim 2 wherein the at least one scattering member comprises at least one scattering element, wherein the at least one scattering element comprises at least one selected from amongst a diffuse scattering element and a specular reflection scattering element.

6. Apparatus as claimed in claim 1 wherein the plurality of illumination sources are arranged in an array being one selected from amongst a one dimensional array, a two dimensional array and a three dimensional array, wherein at least one of the plurality of illumination sources comprises at least one illumination element or a plurality of illumination elements.

7. Apparatus as claimed in claim 1 operable to adjust an intensity of illumination of each of the plurality of illumination sources independently of one another.

8. Apparatus as claimed in claim 7 arranged to increase an intensity of illumination of at least one of the plurality of illumination sources when ambient light is incident on the display such that the intensity of illumination from one of the illumination sources projected along a given primary vector relative to the intensity of light reflected from the display along said given primary vector falls below a prescribed level, thereby to increase the relative intensity of illumination from the apparatus along said given primary vector.

9. Apparatus as claimed in claim 1 wherein the display portion comprises a panel arranged selectively to transmit light from the illumination source therethrough thereby to introduce contrast into the image.

10. Apparatus as claimed in claim 9 wherein the panel is arranged selectively to transmit light therethrough along a direction parallel to the respective different primary vectors, or wherein the panel is operable to transmit light therethrough along a direction parallel to a selected one or more of the plurality of respective different primary vectors.

11. Apparatus as claimed in claim 9 wherein the panel comprises a liquid crystal display panel.

12. A motor vehicle having a display apparatus according to claim 1.

13. A vehicle as claimed in claim 12 wherein the apparatus is mounted to a dashboard of the vehicle, the display being visible to a driver and a passenger of the vehicle.

14. A vehicle as claimed in claim 13 wherein the apparatus has a first primary vector arranged to be directed from the display to eyes of the driver and a second primary vector arranged to be directed from the display to eyes of the passenger in their normal seated positions.

15. A vehicle as claimed in claim 14 wherein the apparatus is arranged to direct illumination along the second primary vector only when the passenger is seated in the vehicle.

16. A vehicle as claimed in claim 14 wherein the display is arranged to direct illumination along the first primary vector only when the driver is seated in the vehicle.

17. A method of displaying an image, the method comprising;
  displaying on a display portion of a display apparatus an image having a brightness and/or a contrast which varies as a function of viewing angle;
  arranging the brightness and/or contrast of the image to have at least one local maximum along a direction substantially parallel to at least one primary vector of the apparatus;
  determining whether or not a user requires to view the display along a direction parallel to a respective different one of a plurality of primary vectors;
  selectively energizing one or more of a plurality of illumination sources comprised within the display apparatus in dependence on said determination, and;
  projecting light in a direction parallel to the primary vector along which the user requires to view the display to display the image to the user.

18. A method as claimed in claim 17 comprising;
  mounting the display apparatus to a dashboard of a vehicle, the display portion being visible to a driver and a passenger of the vehicle;
  arranging a first primary vector to be directed from the display to eyes of the driver, and;
  arranging a second primary vector to be directed from the display to eyes of the passenger in their normal seated positions.

19. A method as claimed in claim 18 comprising directing illumination along the second primary vector only when the passenger is seated in the vehicle.

20. A method as claimed in claim 18 comprising directing illumination along the first primary vector only when the driver is seated in the vehicle.

* * * * *